US007748881B2

(12) United States Patent
Strazzanti et al.

(10) Patent No.: US 7,748,881 B2
(45) Date of Patent: Jul. 6, 2010

(54) TAILOR WELDED STRIP BULB SHIELD

(75) Inventors: Michael A. Strazzanti, Gates Mills, OH (US); Zi Qiang Sheng, Olmsted Township, OH (US)

(73) Assignee: Isatec of Ohio, Inc., Cleveland, OH (US)

( * ) Notice: Subject to any disclaimer, the term of this patent is extended or adjusted under 35 U.S.C. 154(b) by 8 days.

(21) Appl. No.: 11/970,940

(22) Filed: Jan. 8, 2008

(65) Prior Publication Data

US 2008/0170410 A1 Jul. 17, 2008

Related U.S. Application Data

(60) Provisional application No. 60/883,972, filed on Jan. 8, 2007.

(51) Int. Cl.
*B60Q 1/00* (2006.01)

(52) U.S. Cl. ....................... 362/539; 362/303; 362/305; 313/117

(58) Field of Classification Search ................. 362/303, 362/305, 538, 539; 313/117
See application file for complete search history.

(56) References Cited

U.S. PATENT DOCUMENTS

| | | | | |
|---|---|---|---|---|
| 6,012,830 | A * | 1/2000 | Fraizer | 362/539 |
| 6,375,341 | B1 * | 4/2002 | Denley | 362/539 |
| 6,430,799 | B1 | 8/2002 | Ballard et al. | |
| 6,776,515 | B2 * | 8/2004 | Schmitt | 362/539 |
| 6,786,624 | B2 * | 9/2004 | Poorman | 362/539 |
| 7,011,361 | B2 | 3/2006 | Reed et al. | |

* cited by examiner

*Primary Examiner*—Stephen F Husar

(57) ABSTRACT

A vehicle bulb shield with material differences in configuration, thickness, strength, grade or surface coating in the leg and shield sections, manufactured from a tailor welded steel strip of different materials to obtain desired corresponding combinations of features in each component from each material. A progressive forming process is used to accommodate the different metal combinations within the tailor welded steel strip (e.g. material type and/or thickness), and thereby allow new material property configurations in the bulb shield components. A material property configured bulb shield design enables consideration of formability of material in different component sections, the rigidity of material in different component sections, and cost of different materials, in a single component design. Since vehicle bulb shields can be configured with locally different material properties, the improved tailor welded strip bulb shield with specific material property configurations in the different bulb shield components can possess higher rigidity, higher complexity and lower cost.

11 Claims, 2 Drawing Sheets

TAILOR WELDED STRIP BULB SHIELD

CROSS-REFERENCE TO RELATED APPLICATION

The present application claims priority from U.S. Patent Application Ser. No. 60/883,972, filed Jan. 8, 2007, the entire subject matter of which is incorporated herein by reference.

BACKGROUND OF THE INVENTION

1. Field of Invention

The present invention relates to a vehicle lamp assembly, and to vehicle bulb shields, and more specifically to a vehicle bulb shield manufactured from a tailor welded steel strip of different materials to obtain desired features in each component of the vehicle bulb shield from each material within the tailor welded steel strip.

2. Background of the Related Art

A vehicle bulb shield, which is generally made from sheet metal, is mounted within a vehicle lamp assembly in front of the bulb of a vehicle headlamp to prevent emission of glare light and to generate a desirable light pattern. Due to the working environment of a vehicle, bulb shields are required to have enough vibration durability to service a committed life-cycle or service life of the vehicle. Vehicle bulb shields are required to meet specific vibration tests such as SAE J577. These vibration tests involve a multi-axis shaking of the vehicle bulb shield over a range of frequencies. The purpose of these vibration tests is to ensure the vehicle bulb shield will remain in place and intact during the service life of the vehicle. Should the vehicle bulb shield fail to maintain its position or presence as intended, the vehicle headlamp would emit a beam pattern outside of the federally mandated constraints as described in FMVSS 108. Emission of light or a beam pattern outside the required federal parameters would potentially create unsafe conditions for the driver or the driving of an oncoming vehicle, such as reduced visibility, and could potentially cause discomfort or disabling glare to oncoming drivers.

Prior art vehicle bulb shields are generally composed of two major features: one is a deep drawn shield or cup portion, which is positioned in front of the vehicle headlamp bulb, and is designed to generate a desired photometric pattern of light from the headlamp; second is a rigid leg portion which secures the bulb shield within the vehicle lamp assembly, maintains the desired bulb shield position and ensures vibration durability. Thus, a successful bulb shield design requires the sheet metal material to possess a high rigidity at the leg section and a high formability at the shield section.

The earliest vehicle bulb shields, made in the 1980's, were composed of three components: first, a stainless steel stamping welded at the seam, was attached to a second piece retainer, which was welded to a third mounting plate. In the 1990's, two-piece bulb shields were manufactured, where a leg portion and a cup portion were welded together and the exterior surface was nickel-chrome electroplated for corrosion protection and cosmetic appearance. The inner surface of the shield or cup portion is generally painted with high temperature resistant black paint to prevent unwanted reflections of light from the headlamp. More recently, one-piece vehicle bulb shields have been developed, as shown and described in U.S. Pat. No. 6,430,799. The one-piece vehicle bulb shield design is formed from one piece of uniform thickness steel.

The shield or cup section design of a bulb shield requires the sheet metal material to have a higher ductility to enable a successful drawing operation, or formation of the cup section. However, the leg section requires a higher strength for resistance to vibration failure during testing and service. Both the prior art two-piece and three-piece bulb shield designs could readily meet this requirement by the welding of a strong leg component, made from thinner and/or stronger sheet metal materials, to a light weight shield component made from thinner and more ductile sheet metal materials. As the one-piece vehicle bulb shield designs are limited to a uniform sheet metal material, prior art one-piece designs have either failed the vibration test due to choosing thinner or weaker sheet materials, such as cold rolled steel, or if successful, have become too expensive to manufacture, due to the use of expensive stainless steels which have both strength and ductility. A comparison of material cost and vibration durability of the three types of prior art vehicle bulb shields is summarized in Table 1.

TABLE 1

Comparison of cost and vibration performance of bulb shields

| | 3 - piece bulb shield | 2 - piece bulb shield | 1 - piece bulb shield |
|---|---|---|---|
| Material Cost | Highest | High | Lowest |
| Vibration durability | Highest | High | Lowest |

Tailor welded blank (TWB) technology was initially developed in the 1940's and used to reduce overall part weight in a variety of applications including the automotive industry. One such application is described in U.S. Pat. No. 7,011,361. TWB technology involves welding sheets together which have different thicknesses prior to subjecting the sheets to further forming processes so the designer is able to "tailor" the location in the stamping to the specific material properties desired. The manufacture of continuous tailor welded strips is a newly developed technology.

SUMMARY OF THE INVENTION

The present application provides an improved vehicle bulb shield. The complex geometry and low cost requirements of current vehicle bulb shields makes progressive die forming the major process for manufacturing vehicle bulb shields. One limitation in the ability of the vehicle bulb shield to pass the necessary vibration testing requirements is the relationship between the mass of the shield portion and the strength of the leg portion. In the case of the prior art two-piece welded assembly, this limitation was mitigated by selecting stronger or thicker steel for the leg portion component and a lighter and thinner material for the cup portion component.

In the case of the current one-piece bulb shield, the opportunity for multiple materials is lost, as the entire component is formed from one single, homogenous steel strip. As a result, current design limitations are placed on the various components (i.e., designs are aimed at passing vibration tests, at the expense of stylistic and photometric design features, which are sacrificed.) In some instances the leg portion of one-piece shields must be made wider and formed with strengthening features such as side walls and gussets. These features can negatively impact the headlamp performance by shading portions of the headlamp light output, which may be desirable or even necessary to achieve a high quality beam pattern. In another instance, a large cup portion may be desirable for aesthetics but due to the increase in shield portion mass, the weight causes the component to fail vibration testing.

When this situation arises the conventional method of achieving a solution is to form the leg portion from one strip of thicker or stronger steel, and the shield portion from thinner steel. These two components are then connected together in a secondary operation such as resistance spot welding. This solution requires two progressive forming tools, one to form the leg portion and one to form the shield portion. The expense of a welding fixture and labor for a secondary operation is also added. These costs are above the requirements for a one piece design and are therefore economically undesirable.

The present application provides a new and improved vehicle bulb shield, which makes use of continuous strip welding technology to weld two strips of dissimilar steel together prior to material forming the strip into a one-piece bulb shield. The use of the in-line process of welding two strips of steel together prior to the forming processing provides the desired mechanical and optical benefits from using different desired materials for the different bulb shield components, as in the prior art two-piece bulb shield, with the additional cost advantages provided by manufacturing using current one-piece vehicle bulb shield forming two steels with similar physical strength but dissimilar in thickness; two steels with similar thickness but dissimilar in strength; or two steels dissimilar in physical strength and thickness processes.

In the one-piece vehicle bulb shield of the present application, two strips of steel are selected based upon the features or characteristics desired in the components of the specific bulb shield design, which may vary from headlamp to headlamp. The possible combinations are numerous, such as two steels with similar physical strength but dissimilar in thickness; two steels with similar thickness but dissimilar in strength; or two steels dissimilar in physical strength and thickness.

BRIEF DESCRIPTION OF THE DRAWINGS

FIG. 1 *b* schematically illustrates a cross-sectional view of a vehicle bulb shield installed in a vehicle headlamp, with the headlamp bulb, the bulb shield, and the headlamp reflector;

FIG. 1 *c* schematically illustrates a prior art one-piece vehicle bulb shield;

FIG. 2 *b* illustrates a prior art two-piece design bulb shield;

FIG. 2 *c* illustrates a one-piece design bulb shield;

DETAILED DESCRIPTION OF THE INVENTION

Figure 4:
FIG. 4 schematically illustrates a strip of steel comprised of two materials, differing in thickness and/or composition, welded together along a longitudinal seam.
Figure 5:
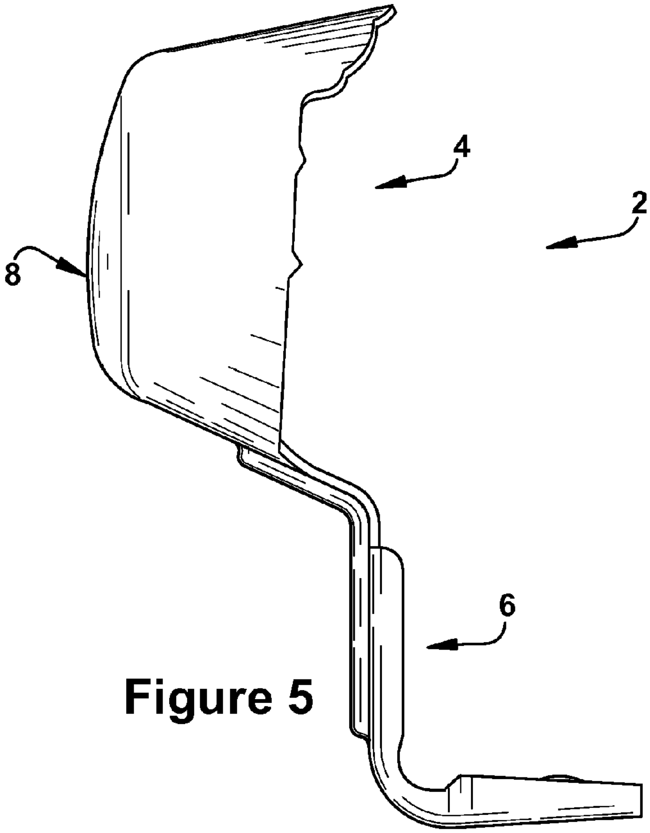
FIG. 5 illustrates a one-piece bulb shield design with improved rigidity using a tailor welded strip of the type shown in FIG. 4 and described in the present application.

The present application provides a new and improved one-piece vehicle bulb shield 2 formed from a welded strip 12 of two metal materials 14, 16 using a continuous forming process. As shown in FIG. 4, two strips of steel, one of a thicker or stronger material 14 and the other of a thinner or lighter material 16, are welded side by side along a weld 18. This single strip 12 of two metal materials is then fed through a forming tool, such as a progressive die, to form a one-piece bulb shield 2 comprised of the two different welded steel materials 14, 16 having different desired material properties for use in a leg portion.

By performing the welding operation on the two steel materials 14, 16 prior to forming the vehicle bulb shield 2, several advantages over prior art one and two piece bulb shield designs are obtained. The use of two different materials to form components of the bulb shield 2 improves the design limitations previously found in a one-piece bulb shield formed from a single type of uniform steel material. Strips of different steel materials 14, 16 suitable for welding are commercially available from TWB Company, LLC, 1600 Nadeau Road, Monroe, Mich. 48162. Various types of steel materials which may be used are shown, for example, in Tables 2 and 3.

The mechanical limitations of vehicle bulb shield design include, for example, the ratio of the mass of the shield portion 4 to the strength of the leg portion 6. As this ratio increases, the bulb shield 2 becomes weaker and is more likely to deform or fracture during vibration or stress. One key factor in the strength of the leg portion is the minimum cross sectional area at any point from the lamp attachment to the bulb shield.

Ideally the design of the bulb shield 2 would be based on this mechanical ratio to assure compliance with the required vibration testing. However, the leg portion 6 of the bulb shield 2 is restricted in width by optical requirements of the headlamp 10. Ideally, from an optics standpoint, the shield portion 4 of the bulb shield 2 would hover in mid air around the headlamp bulb 1. The presence of a leg portion 6 is a necessary sacrifice of light output due to its shading action in the headlamp 10. The minimization of the width of the leg portion 6 is therefore sought after by optical designers. At times this compromise causes performance sacrifices in the headlamp 10 performance, and/or economic benefit. If the desired bulb shield 2, from a mechanical perspective, is selected, the lamp bulb 1 may be shaded in areas which are undesirable, and overall lamp light output may not be optimized. If the desired bulb shield 2, from an optical perspective, is chosen, it may be necessary to select a steel material having higher strength. These materials are more expensive, as is the cost to engineer and build a tool capable of forming them into bulb shields.

Another option instead of choosing a higher grade of steel material for improved strength, or increasing the width of the leg portion 6, is to increase the leg portion strength by forming the bulb shield portion 4 from a thicker steel which is of a lower grade. However, this solution offers a marginal benefit in bulb shield 2 mechanical strength, if any at all. This is due to the increase in bulb shield 2 mass as the cross-sectional area of the leg portion 6 is increased.

Depending on the design of the shield portion 4, the overall volume of the shield portion may be very high in relation to the leg portion 6. In these situations, the gains in strength of the leg portion 6 from increased thickness are offset by a disproportionate increase in the mass of the shield portion 4. The present application provides a vehicle bulb shield 2 composed of two welded steel materials. The use of two steel materials 14, 16 enables the shield portion 4 and leg portion 6 to be manufactured with the desired material characteristics for each component. In the present vehicle bulb shield 2 design, the steel materials may have similar physical strength but be dissimilar in thickness, as shown in FIG. 4. Alternatively, the two steel materials 14, 16 may have similar thickness but be dissimilar in strength. Still further, the improved vehicle bulb shield 2 may have two steel materials which are dissimilar in both physical strength and in thickness. Table 3 shows some examples of possible steel material combinations for the vehicle bulb shield 2 components:

TABLE 2

Possible bulb shield material combinations

| | Material 1 (leg 6) Material Grade | Tensile Strength (ksi) | Thickness (inches) | Material 2 (shield/cup 4) Material Grade | Tensile Strength (ksi) | Thickness (inches) |
|---|---|---|---|---|---|---|
| Combination 1 | DQ CRS | 27 | 0.03 | DQ CRS | 27 | 0.02 |
| Combination 2 | DQ CRS | 27 | 0.04 | DQ CRS | 27 | 0.02 |
| Combination 3 | HSLA40 | 40 | 0.03 | DQ CRS | 27 | 0.02 |
| Combination 4 | DP 800 | 105 | 0.03 | DQ CRS | 27 | 0.03 |

As shown in Table 2, Combination 1 shows the portion of the strip 12 from which the leg portion 6 is formed as being draw quality (DQ) cold rolled steel (CRS) having a thickness of 0.030 inches. The shield portion 4 in Combination 1 is formed from the same type of material, DQ, with a thickness of 0.020 inches. This offers the increased strength of a thicker leg portion 6, and therefore a larger cross-sectional area, than if the entire shield were formed from the thinner 0.020 inch DQ steel. The benefit of lower mass with a smaller 0.020 inch thickness DQ shield portion 4 is also gained.

Combination 2 provides a different example, with a 0.040 inch thick leg portion 6 and a 0.020 inch thick shield portion 4.

The Combination 3 example shows a leg portion 6 formed from high strength low alloy (HSLA) steel which has a higher tensile strength than DQ steel material. The two materials are the same thickness. However, the increased tensile strength of the HSLA material in the leg portion 6 improves the mechanical strength of the leg portion, and therefore, the bulb shield's ability to withstand vibration. The DQ steel material used in the shield portion 4 component in Combination 3 offers the advantage of producing the shield portion 4 from the lower cost material.

Combination 4 provides a leg portion formed from 0.030 inch Dual Phase (DP) 800 steel with a tensile strength which is higher that the DQ steel material from which the shield portion is formed. This combination has the advantage of dissimilar material thicknesses as described in Combinations 1 and 2, with the increased benefit of an even higher strength steel in the leg portion 6 of the bulb shield 2. As in Combination 3, the use of DQ steel material as the shield portion 4 material offers the lower cost advantage.

Many factors affect the vibration durability of vehicle bulb shield 2. At a given edge condition, the vibration durability is determined by the rigidity of structure. Experimental results given in Table 3 indicate a series of improved vehicle bulb shield designs in accordance with the present invention which provide mechanical, design and cost advantages over conventional uniform material one-piece vehicle bulb shields.

TABLE 3

| | Material 1 (leg) | | Material 2 (shield/cup) | | Cycles to |
|---|---|---|---|---|---|
| | Material Grade | Thickness (inches) | Material Grade | Thickness (inches) | failure @ 24 Hz |
| Combination 1 | DQ CRS | 0.03 | DQ CRS | 0.03 | 216,000 |
| Combination 1 | DQ CRS | 0.03 | DQ CRS | 0.02 | 267,840 |
| Combination 2 | DQ CRS | 0.04 | DQ CRS | 0.02 | 440,640 |

TABLE 3-continued

| | Material 1 (leg) | | Material 2 (shield/cup) | | Cycles to |
|---|---|---|---|---|---|
| | Material Grade | Thickness (inches) | Material Grade | Thickness (inches) | failure @ 24 Hz |
| Combination 3 | HSLA40 | 0.03 | DQ CRS | 0.02 | 406,080 |
| Combination 4 | DP 800 | 0.03 | DQ CRS | 0.03 | 587,520 |

The vibration resistance or improved strength of the present vehicle bulb shield 2 is one advantage provided by the techniques of this application. An additional advantage is provided in that the technology improves the cosmetic appearance of the bulb shield in selective areas, also with improved cost advantages over conventional methods.

The quality of the external surface 8 appearance of the cup portion 4 of the bulb shield 2 after electroplating of the steel material is directly related to the initial surface quality of the that portion of the steel material. The electroplating process can fill in minor blemishes and scratches, but only to a certain extent. Poor surface quality steel which is subjected to the electroplating process will never produce a quality surface finish of the type obtained when starting with a high surface quality steel. Increased nickel thickness of the electrodeposits can be used to improve the surface finish, but at an increased cost.

Producing steel components from high surface quality sheet steel stock is common in the production of cosmetic parts. In the manufacturing process of the sheet steel, special processes including alloying and rolling mill technologies are utilized to improve the surface quality. These materials are readily available under various classifications such as bright, best bright, #2 best bright, etc. The cost of these improved surface quality steel products is greater than that of the standard steel mill output products.

Figure 1A:
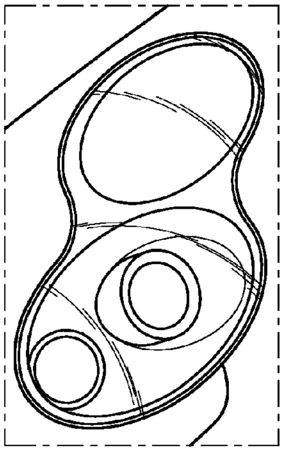
FIG. 1 *a* illustrates a prior art vehicle headlamp.
Figure 1B:
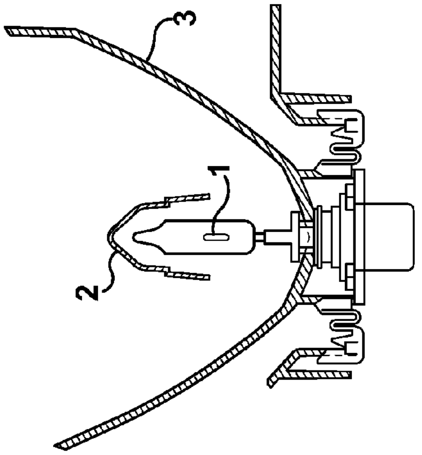
Figure 1C:
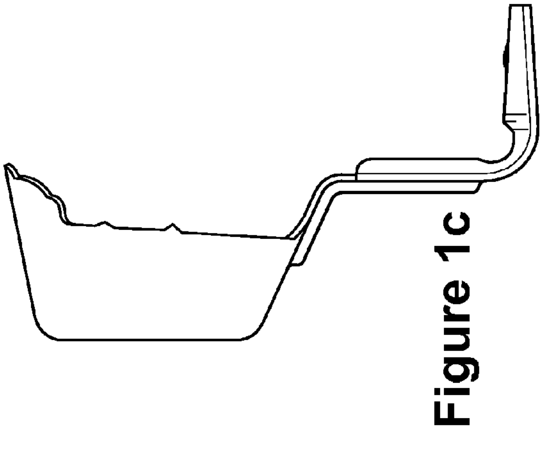
Figure 2A:
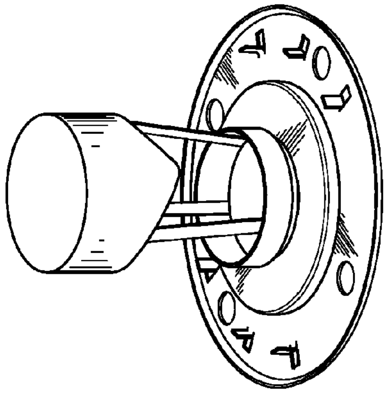
FIG. 2 *a* illustrates a prior art three-piece vehicle bulb shield.
Figure 2B:
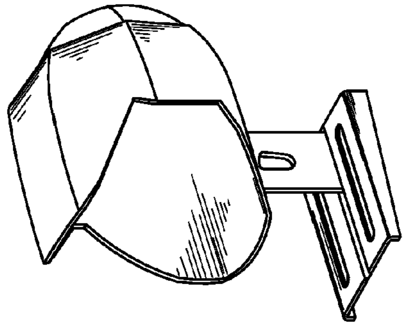
Figure 2C:
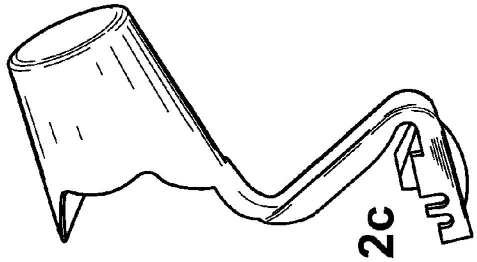
Figure 3:
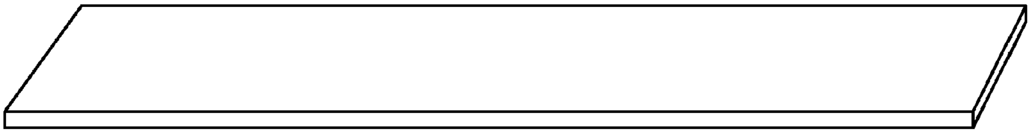
FIG. 3 schematically illustrates a strip of sheet steel uniform in thickness and composition.

As shown in FIG. 1*a*, vehicle bulb shield 2 components are installed in headlamps 10 with clear protective cover lenses that offer a direct view of the exterior surface 8 of the cup portion 4 of the bulb shield 2. As a result, the external surface 8 of the cup portion 4 of the bulb shield component is required to have a highly reflective and homogenous surface appearance. In some instances this is achieved by electroplating nickel and chrome onto the exterior surface 8. The electroplated coating offers both a bright cosmetic mirror finish and corrosion resistance in the bulb shield 2.

As the cup portion 4 of the vehicle bulb shield 2 is most visible, it is commonly required to have a higher cosmetic appearance than the leg portion 6 of the bulb shield 2. The conventional uniform material, one-piece bulb shield design requires that the entire component have the same sheet steel material properties. Thus, if the cup portion 4 of the bulb shield 2 requires a bright finish material but the leg portion 6 does not, the bulb shield 2 must be manufactured of a bright finish steel strip. In such a situation, the premium cost of the bright finish sheet steel strip forming the leg portion 6 is wasted. The present vehicle bulb shield application contemplates the tailor welding of a strip of steel 12 with a bright finish to a steel strip with a standard finish. The tailor welded strip produces a bulb shield 2 with the required cosmetic appearance only in the cup portion 4, and at a lower cost than if the entire strip 12 were of a bright finish material quality.

Alternatively, obtaining the desired cosmetic appearance can be accomplished using pre-coated steel materials. As previously mentioned, one method of improving the surface quality of an electroplated steel product is to increase the thickness of the nickel electrodeposits on the desired surface. In the case of the conventional uniform material, one-piece vehicle bulb shield 2 the entire part will have increased nickel thickness, and the increased nickel on the leg portion 6 will be wasted. Additionally, the build up of nickel in the leg portion 6 may cause the dimensional requirements of the leg portion, such as retaining tabs and overall width, to be outside the desired tolerances and to fail proper installation within the headlamp assembly 10.

Steel strips 12 are commercially available which are electroplated with nickel. By combining a strip of pre-plated material with a standard material, a preferentially thick nickel layer can be achieved for use in the cup portion 4 of the vehicle bulb shield 2.

For example, a strip of CRS with a pre-plated nickel layer 0.0005 inches thick may be welded to a CRS strip without any plating. This tailor welded strip 12 of the two materials 14, 16 is then formed using a progressive tool into a dual material, one-piece bulb shield, where the cup portion 4 is formed out of the pre-plated section of the strip, and the leg portion 6 is formed from the raw CRS section of the strip. The formed bulb shield is then put through a nickel electroplating process where a 0.0005 inch nickel layer is applied with relative uniformity to the vehicle bulb shield. The result is a bulb shield 2 with a cup portion 4 having 0.001 inch nickel layer and a leg portion 6 having a 0.0005 inch nickel layer. The bulb shield cup portion 4 will have the required improved cosmetic appearance provided by the additional nickel material, and less additional nickel is wasted on the leg portion 6. Similar combinations for various coatings such as electrodeposits, paints and oxides can be used for improved cosmetic appearance in the vehicle bulb shield. Other combinations, such as combining materials with different thermal properties or corrosion resistance are also possible where called for in the design.

The combinations given here are provided as examples of possible improvements in the properties of a vehicle bulb shield using tailor welded strips of material. Configuring the properties of the bulb shield 12 with tailor welded strips 12 formed in progressive stamping tools, as opposed to tailor welded banks which require line dies or transfer presses, provides cost advantages using the present invention. While certain embodiments of the invention have been described in detail here, it will be appreciated by those of skill in the art that various modifications and alternatives to the embodiments could be developed in light of the overall teachings of the disclosure. Accordingly, the particular components and arrangements are illustrative only and are not limiting as to the scope of the invention which is to be given the full breadth of any and all equivalents thereof.

We claim:

1. A vehicle bulb shield formed of at least two metal materials welded together prior to formation by a continuous metal stamping process of a leg portion component of the one metal material having the material properties desired for the leg portion component, and formation of a cup portion component of the second metal material having the material properties desired for the cup portion component.

2. The vehicle bulb shield of claim 1, wherein the leg portion component is formed of a stronger steel metal material, and the cup portion component is formed of a metal material which is lighter in weight than the steel metal material forming the leg portion component.

3. The vehicle bulb shield of claim 2, wherein the welded metal materials forming the leg portion component and the cup portion component have different thicknesses, with the leg portion component formed from a steel metal material which is thicker than the metal material forming the cup portion component.

4. The vehicle bulb shield of claim 1, wherein the second metal material forming the cup portion component is an electroplated steel metal material.

5. The vehicle bulb shield of claim 1, wherein the second metal material forming the cup portion component has improved cosmetic material properties to enable manufacture of the cup portion component with an external surface finish which is cosmetically superior to that of the leg portion component.

6. The vehicle bulb shield of claim 4 wherein the second metal material is electroplated with a nickel metal material.

7. The vehicle bulb shield of claim 5 wherein the second metal material is an electroplated nickel metal material.

8. A vehicle bulb shield having a leg portion component and a cup portion component formed by the steps of:

selecting a strip of metal material having the material properties desired in the leg portion component;

selecting a strip of metal material having the material properties desired in the cup portion component;

welding the two selected metal materials together to form a uniform strip of dual materials;

forming the one-piece vehicle bulb shield using a continuous metal stamping process to form the leg portion component and cup portion component from the selected single welded strip of dual metal materials.

9. A one-piece vehicle bulb shield formed of two metal materials welded together prior to formation of the one-piece vehicle bulb shield using a continuous manufacturing process to form a leg portion component of a metal material having material properties desired for the leg portion component, and a cup portion component of a second metal material having material properties desired for the cup portion component.

10. The one-piece vehicle bulb shield of claim 9, wherein the two welded metal materials are of different thicknesses.

11. The one-piece vehicle bulb shield of claim 10, wherein in the leg portion component is formed of a metal material having material properties sufficient to resist failure due to vibration during operation of a vehicle.

* * * * *